Patented June 16, 1931

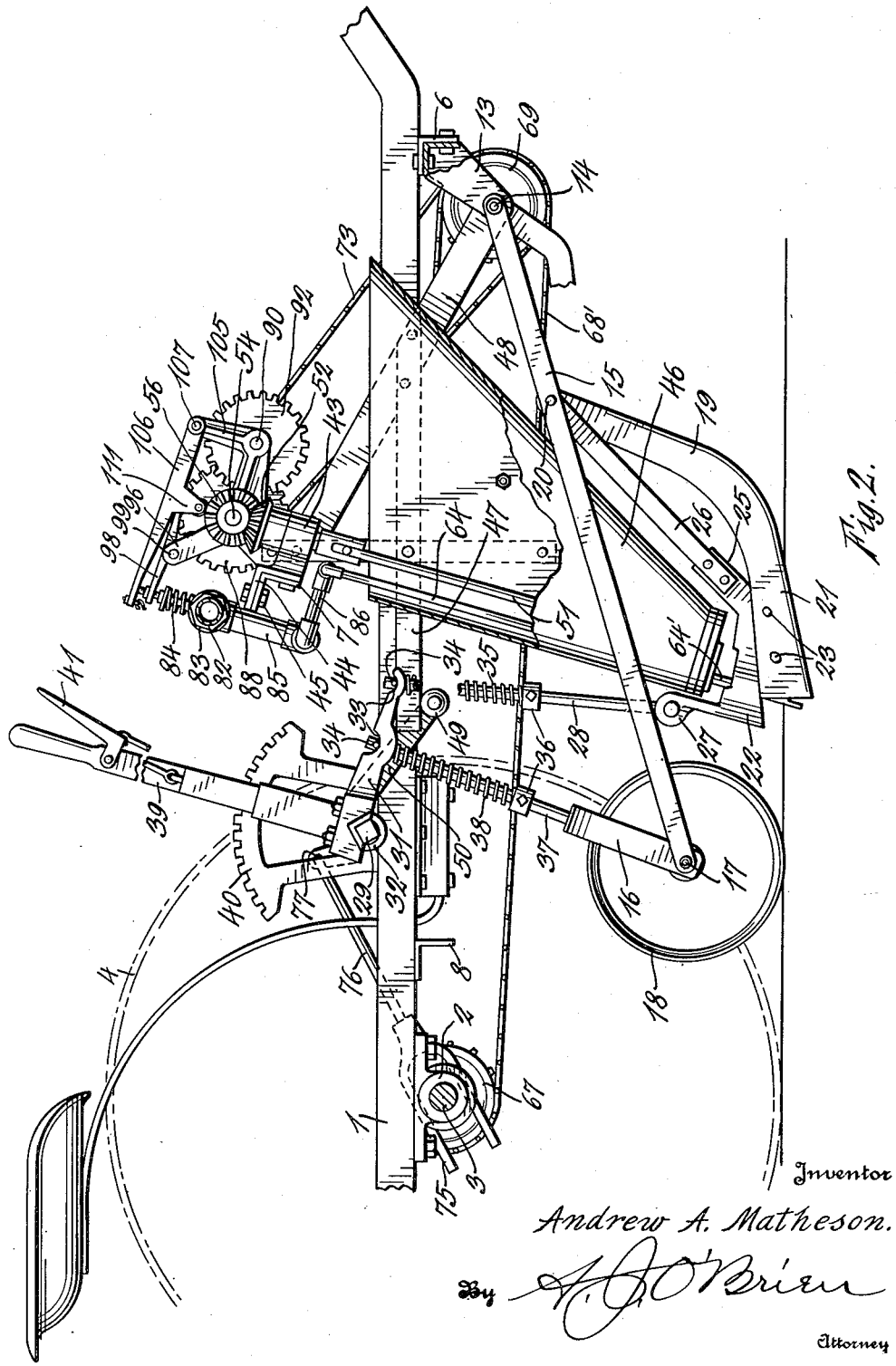

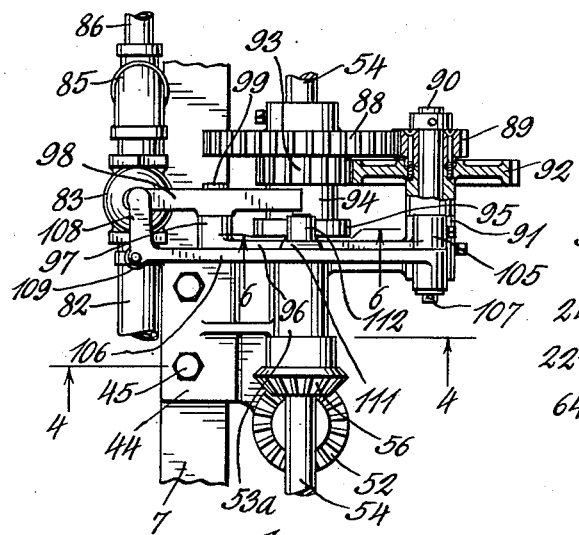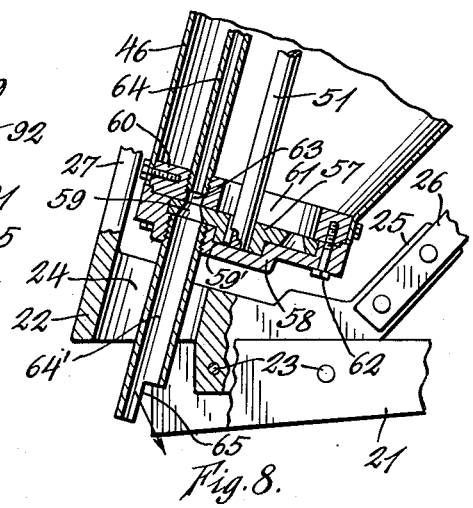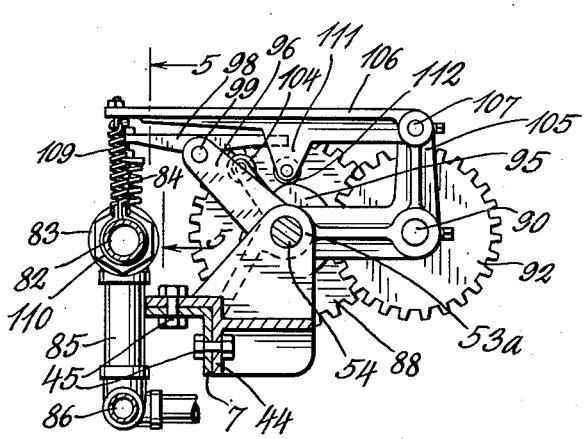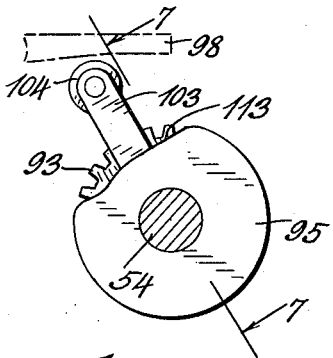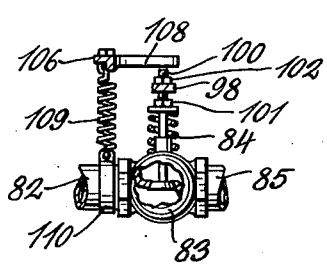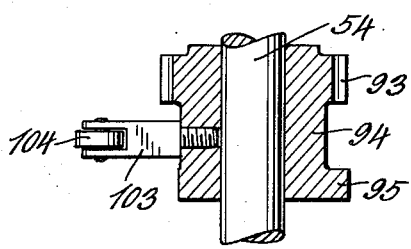
Inventor
Andrew A. Matheson.

1,810,671

UNITED STATES PATENT OFFICE

ANDREW A. MATHESON, OF DENVER, COLORADO, ASSIGNOR TO MATHESON PNEUMATIC PLANTERS CORPORATION, OF LANDER, WYOMING, A CORPORATION OF WYOMING

PNEUMATIC PLANTER

Application filed September 23, 1929. Serial No. 394,488.

This invention relates to improvements in planters and has reference more particularly to a planter designed for use in planting sugar beets, cotton seed and other light rough seeds or seeds that have lint attached to them and which, for this reason, are liable to get stuck.

In the planting of sugar beets, it has heretofore been impractical to drop the seeds in hills and the seeds have therefore been drilled in rows and after the seeds have come up the field has been thinned by hoes so as to leave hills a certain distance apart. This way of planting sugar beets has been found objectionable for several reasons among others, for the reason that in the usual way of planting the seeds scatter in falling from the dropper to the ground with the result that some may get into the bottom of the furrow and others may become lodged on the sides, and this produces an unequal germination with the result that some of the seed sprouts emerge from the soil much sooner than others and that this germination is dependent to a great extent on the moisture conditions prevailing. If there is an abundance of rain shortly after the seeds have been planted, the seeds nearest the top will appear first, but if a spell of dry weather should follow the planting the seeds nearer the top will not have sufficient moisture surrounding them to start germination, while the seeds at the bottom of the furrow will germinate first, owing to the fact that the ground surrounding them is moist.

It is the object of this invention to produce a planter that shall be so constructed that it is possible to deposit beet seeds in hills and to assure that all the seeds are deposited substantially at the bottom of the furrow so that they will be subjected to the same moisture conditions and that the seeds will therefore germinate at the same time and this enables them to break through a hard crust of ground because all of the sprouts join in the effort to break through the crust. Where seeds are planted separately as in drills, each seed must break its own way through the crust and in places where the ground is irrigated, the crust is usually quite hard, and therefore many of the seeds are unable to penetrate this crust and die.

In U. S. Letters Patent No. 1,638,048, issued to me August 9, 1927, I have shown and described a mechanism for dropping sugar beet seeds which is operated by means of power derived from the rotation of the wheels of the planter and which employs compressed air for imparting a high velocity to the seeds and for moving them through the conduit from the dropper to the furrow so as to make it possible to drop the seeds in hills.

It is the object of this invention to produce a planter employing the dropping mechanism described and claimed in the patent above identified and which shall be provided with various improvements for obtaining the most satisfactory results with the use of this pneumatic dropping device.

It is an object of this invention to produce a planter in which the dropping mechanism shall be located only a short distance above the surface of the ground, so that the conduit leading from the mechanism can be made as short as possible, as this has been found to be necessary in order to obtain the best results.

It is another object of this invention to produce an improved valve operating mechanism for controlling the compressed air so as to use this to the best effect.

Another object of this invention is to produce a planter in which the parts shall, to a great extent, be located underneath the frame and which shall be provided with means for quickly and conveniently raising the plows and the dropping mechanism, as well as the presser wheels so as to get the parts into inoperative position suitable for turning at corners and for traveling along the road.

The above and other objects that may appear as the description proceeds are attained by means of a construction and an arrangement of parts that will now be described in detail, and for this purpose reference will be had to the accompanying drawings, in which the preferred embodiment of the invention has been illustrated, and in which:

Fig. 2 is a side elevation with parts broken away so as to better disclose the construction;

Fig. 3 is a top plan view of the valve operating mechanism shown in Fig. 4;

Fig. 4 is a side elevation of the valve control mechanism taken on line 4—4, Fig. 3;

Fig. 5 is a section taken on line 5—5, Fig. 4, and shows the valve that controls the air supply;

Fig. 6 is a section taken on line 6—6, Fig. 3, and shows the cam employed for operating the valve;

Fig. 7 is a section taken on line 7—7, Fig. 6; and

Fig. 8 is a section through the bottom of the dropper and shows the relationship of the parts at the instant that the air valve is in open position.

Figure 1:
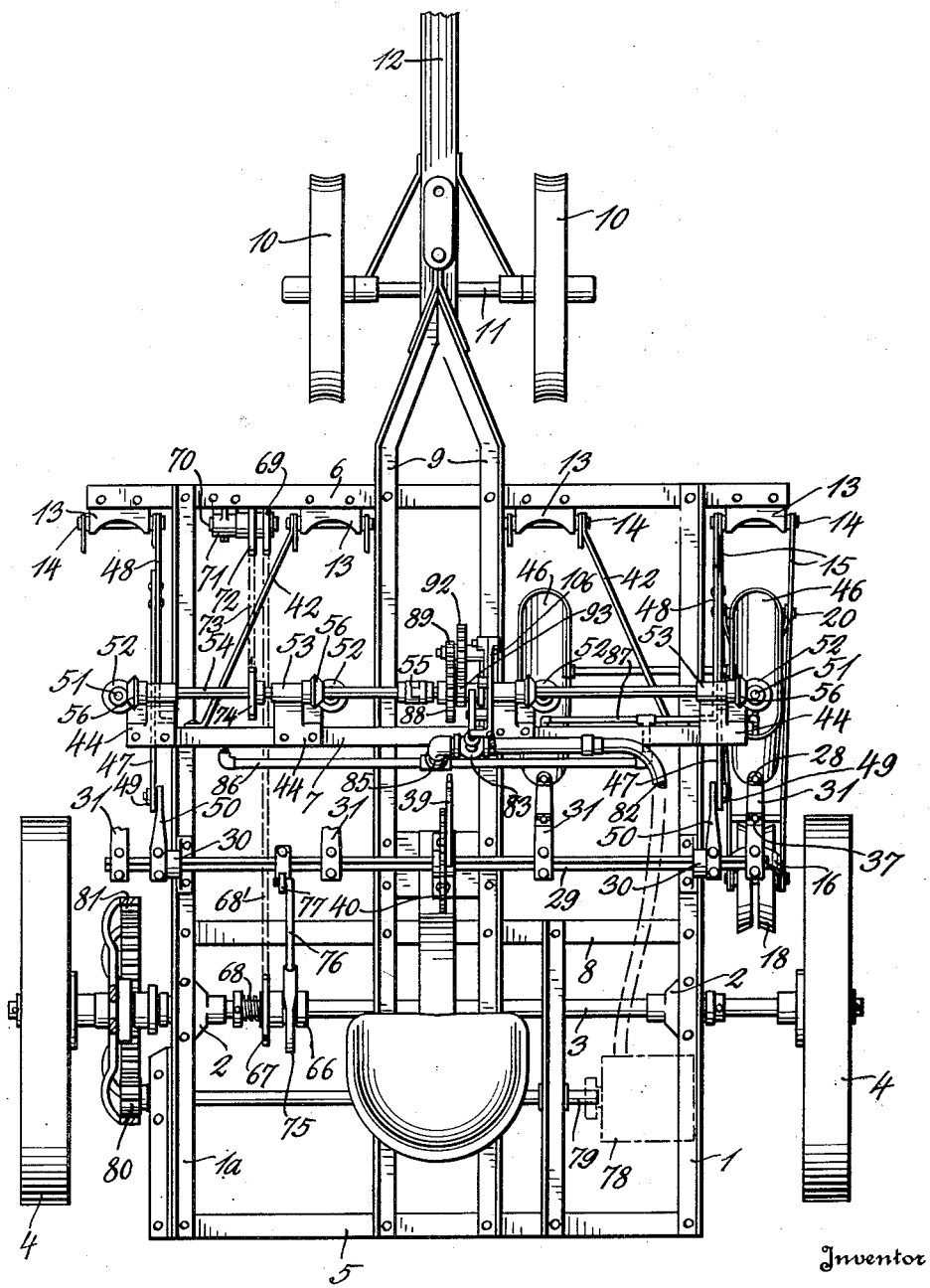
Fig. 1 is a top plan view of the planter.

The planter consists of a frame which may be constructed in specifically different ways, but which in the example illustrated, has two parallel side members 1 and 1a, which are provided with bearings 2 in which the shaft 3 is journaled. Supporting wheels 4 are secured to the ends of the shaft, one of these wheels being rotatably mounted on the shaft, and the other keyed to it so that it will rotate the shaft when the planter is moving. The rear ends of the side members are connected by means of a frame member 5 and the front ends are connected by a similar transverse member 6, which is longer than the distance between the side members and therefore extends beyond the latter in the manner shown in the drawings. In addition to the end members 5 and 6, there are two transverse frame members 7 and 8. Angle iron frame members 9 extend from the rear transverse member 5 to a position in front of the front transverse bar 6 and is secured to the transverse frame members in the manner shown. The angle iron bars 9 are connected at their front ends with a truck having wheels 10, an axle 11 and a tongue 12. This truck serves to support the front end of the planter in a manner quite obvious from the drawings. Connected with the transverse bar 6 are four brackets 13, each of which is provided with openings for the reception of a pivot pin or bolt 14. To each one of the brackets, bars 15 are pivotally connected at their front ends. These bars extend rearwardly to the wheel fork 16 and have their rear ends connected with the axle 17 on which the pressing wheels 18 are mounted for rotation. Runners or plows 19 have their front ends pivotally connected to the bars 15 by means of pivot pins 20. These plows are provided with diverging blades, 21 that are secured to the casting 22 by means of rivets 23. These castings have openings 24 for a purpose which will hereinafter more fully appear and are provided at their front ends with upwardly extending lugs 25 to which the bars 26 are connected. These bars have their upper ends pivoted at 20 in the manner shown at Fig. 2. The rear ends of castings 22 are provided with upwardly extending arms that terminate in a perforated lug 27 with which the lower ends of the rods 28 are connected. A square shaft 29 is mounted for rotation in bearings 30 and is provided with four spaced levers 31 that are secured in place thereon by means of U-bolts 32. These levers have spaced notches 33 with which openings communicate. The bars 28 extend through the openings near the front ends of the levers and are provided with transverse pins 34 that rest in the notches 33. Helical compression springs 35 surround the bars 28 and extend from the under side of the levers 31 to the collars 36 that are clamped to the bars 28. Springs 35 are under compression. Extending upwardly from the wheel forks 16 are bars 37 whose upper ends extend through openings in the levers 31 and are provided with pins 34 that lie in the notches 33. Springs 38 surround the upper ends of bars 37 and have their lower ends resting on the adjustable collars 36. A handle 39 is secured to the square shaft 32 and is provided with a latching lug that cooperates with the toothed quadrant 40. The latching lug is controlled by the small lever 41 that is connected with the upper end of handle 39. When handle 39 is moved rearwardly, it will raise the presser wheels and the plows in a manner quite obvious from Fig. 2. By moving the lever forwardly, the position of the presser wheels and the plows or runners can be adjusted and the latter are free to move upwardly if they strike an obstruction, due for example, to a stone or other hard object.

The transverse bar 7 is secured to the rear ends of links 42 whose front ends are pivotally connected with the bolts 14. Bearings 43 are provided with brackets 44 and are connected with the transverse bar 7 by means of bolts 45. Hoppers 46 are connected at their upper ends with straight bars 47 whose front ends are connected with the links 48 that extend upwardly from bolts 14 to the bearings 43. The rear ends of the bars 47 rest on the rollers 49 that are secured to the lower ends of the levers 50. These levers are connected with the square shaft 29 and are moved whenever the handle 39 is operated. When the handle 39 is moved in a rearward direction, the hoppers are moved about the axes of the pins 14 at the same time that the presser wheels 18 and plows 21 are raised. A shaft 51 is mounted for rotation in the bearing 43 and its upper end is provided with a bevel pinion 52. The same castings that have bearings 43 are also provided with bearings 53 in which the shaft 54 is rotatably mounted. There are four bearings 53 and the shaft 54 is made of two sections connected by a flexible coupling 55. The shaft carries bevel pinions 56 which cooperate with the pinions 52 on the shafts 51, and therefore when shaft 54 is rotated, it will also rotate the shafts 51 to the lower ends of which the disks 57 are connected. The disks 57 rest on the bottom plate 58 of the hoppers and are provided with central hubs 59' that rotate in circular recesses in the upper surfaces of these end plates. Each disk is provided with a number of openings 59 that are upwardly tapered in the manner shown in Fig. 8. A plate 60 is secured to the lower end of each hopper and is provided with a large opening 61 through which the shaft 51 extends. The bottom plates 58 are secured to the plates 60 by means of bolts 62. The large opening 61 is of such size that it is intersected by the locus of the openings 59 as the plate 57 rotates. Plate 60 is also provided with a smaller opening which has been indicated by reference 63 and with which the lower end of the air pipe 64 is connected. The opening 63 is located the same distance from the center of shaft 51 as the openings 59 and therefore these will register with opening 63 once during each revolution of the plate, it is understood that this plate has several openings. A pipe 64' is threadedly connected at its upper end with an opening in plate 58. This pipe extends downwardly to such a distance that when the parts are in the position shown in Fig. 2, its lower end is a short distance above the bottom of the furrow that is cut by the plow. The lower end of this pipe is cut away on the front side, as designated by reference numeral 65. When the seeds are blown downwardly through pipe 64', they will be given a forward motion when they reach the cutout portion 65 and this when combined with the forward motion of the planter will shoot them almost vertically into the soft moist soil. By having the pipe 64 of such length that it terminates near the bottom of the furrow, the air pressure follows the seed the whole distance to the bed and rams them into the moist surface whereby all of the seeds will be planted at a uniform depth and be subjected to the same moisture conditions and will therefore germinate at the same time. This method of planting also places the seeds at an even depth so that the whole field will come through at substantially the same time, whereby a more even stand is obtained. Attention is called to the fact that pipe 64 is short and therefore the air will not have time to pass the seeds and therefore these will move with a high velocity and strike the ground with considerable force, whereas, if a long pipe were used, the pressure of the air would be dissipated before the seeds reach the bottom and instead of being planted in hills the seeds would be distributed for a considerable space owing to the fact that the machine is traveling at a fairly fast speed and if the seeds do not simultaneously reach the seed bed, a considerable space will be produced between the seeds.

For the purpose of rotating shaft 54 at the speed required to drop seeds in properly spaced positions, the following mechanism has been provided. Secured to the axle or drive shaft 3 is a collar 66, which forms part of a clutch member. A sprocket wheel 67 is rotatably connected with the shaft and constrained to move towards the clutch member 66, by a spring 68. When the sprocket wheel engages the clutch member it will be rotated at the same speed as the shaft 3 and this rotation will be transferred by means of a sprocket chain 68 to another sprocket wheel 69 that is secured to a shaft 70 which is secured at one end in the bearing 71. A sprocket wheel 72 is connected with the sprocket wheel 69 and cooperating with this last named sprocket wheel is a sprocket chain 73 that also cooperates with the sprocket wheel 74 on shaft 54. The clutch is controlled by a mechanism comprising a wedge 75 that is connected by means of a rod 76 to the end of a lever 77 and when the shaft 29 is rotated so as to lift the hoppers and the plows, the sprocket wheel 67 will be moved out of gear whereby the shaft 54 will remain stationary at all times during which the hoppers and plows are in inoperative position. Since the planter that forms the subject of this invention required compressed air for successful operation, it is necessary to provide means for compressing the air that is needed. My planter has been equipped with an air compressor 78, which has been shown in a diagrammatic manner only. This compressor is driven from shaft 79 and the outer end of this shaft is provided with a pinion 80 that is driven by an internal gear 81. This gear is connected with the drive wheel 4 in the manner shown, and therefore, the air compressor will always be working whenever the planter is moving. The air is delivered from the compressor to the pipe 82 that extends from the compressor to the valve 83. This valve is held in closed position by means of a spring 84 and is so arranged that the valve member will also be moved towards closed position by the action of the pressure of the air. From the other end of valve 83 a pipe 85 extends to the center of a distributing pipe 86. The ends of pipe 86 are connected with the center portions of smaller pipes 87 that in turn connect with the air pipes 64. When the air compressor is operating and the valve 83 is open, air can flow from the compressor through pipes 82, 85, 86, 87 and 64, and therefore when the rotatable plate 57 is in the position shown in Fig. 8, air can flow freely from the compressor and outwardly through the tube or pipe 64', providing the valve 83 is open.

For the purpose of opening and closing valve 83, so that air will be delivered to pipe 64, at the exact time that one of the openings 59 are in axial alignment with pipes 64 and 64′, I have provided a mechanism which I will now describe. Secured to the shaft 54 is a gear wheel 88 that meshes with a pinion 89 that is carried on shaft 90. One end of shaft 90 is rigidly secured to the front end of bracket 91 in the manner shown in Fig. 3. A gear wheel 92 is connected with the pinion 89 so as to be rotated thereby and this gear is in mesh with a pinion 93 which is rotatably mounted on shaft 54. Pinion 93 has an elongated cylindrical hub 94, one end of which is provided with a cam 95. The bracket 53a in addition to being provided with a forwardly extending arm 91, is also provided with an upwardly and rearwardly inclined arm 96, whose end is formed with a laterally projecting lug 97. A lever 98 is pivotally connected with the lug 97 by means of a bolt 99. The front end of lever 98 is provided with an opening through which the valve stem 100 extends in the manner shown in Fig. 5. This stem has a threaded portion with which is operatively connected a nut 101 that serves to adjust the tension of the spring 84 and with a nut 102 which limits the upward movement of the lever 98. Secured to the cylindrical hub 94 is an arm 103 whose outer end is provided with a roller 104. This roller is so placed that when the pinion 93 is rotated in a clockwise direction, it will engage the under surface of the free end of lever 98 and rotate this lever about the pivot pin so as to open the valve 83. The arm or bracket 91 is provided with an upwardly extending arm 105 to the upper end of which the rear end of lever 106 is pivoted. A pin 107 connects lever 106 to the arm 105. The other end of lever 106 is provided with an offset portion 108 that extends over the upper end of the valve stem 100. A spring 109 connects the free end of lever 106 to an anchoring band 110 that surrounds pipe 82. This spring is so adjusted that when the lever 106 is released, it will move its free end downwardly and unseat the valve 83. The under surface of lever 106 is provided with a downwardly extending projection 111 to the end of which the roller 112 is secured. This roller rests on the surface of cam 95 in the manner shown in Fig. 4 and when shaft 54 is rotated, this cam will also rotate but at a greater speed than the shaft because of the gear train by which it is operated and which has already been described. The speed at which the cams 95 and 103 are rotated is such that they make one complete revolution in the same time that plate 57 moves the angular distance between two adjacent holes 59, and therefore, when the parts are properly adjusted, valve 83 will be open every time that a hole 59 gets into the position shown in Fig. 8. When plates 57 rotate, seed will drop into the openings 59 and be carried into position between pipes 64 and 64′ and if the valve 83 is opened at this instant, a blast of air will strike the seeds from above and impart to them a high downward velocity that will, in effect, "shoot" them into the seed bed in a manner analogous to the action of an air rifle.

The operation of the valve control mechanism is as follows: If we refer to Figs. 4, 5, 6 and 7, it will be seen that when shaft 54 and cams 95 and 103 rotate in a clockwise direction, the roller 112 will pass from the circular surface of the cam to the cam surface 113 and this should occur at the instant that one of the holes 59 come into substantial alignment with the opening in plate 61. When the roller enters onto the cam surface, the lever 106 is permitted to move downwardly and the tension of the spring 109 is exerted on the upper end of valve stem 100 and this spring is so tensioned that it will overcome the action of spring 84 and the air pressure and move the valve to open position. A short time after the lever 106 has functioned to open the valve, the roller 104 engages the under surface of lever 98 and opens the valve to full open position, which should occur at the instant that the holes 59 come into axial alignment with pipes 64′. The blast of air that is permitted to flow will now strike the seeds and move them downwardly in the manner already described. As soon as roller 104 passes beyond the end of lever 98, the valve will close as the cam surface has been so arranged that before this occurs lever 106 will have been moved upwardly into inoperative position. This valve must open and close with great rapidity and at the precise time when the parts are in aligned position, it must be made rigid and strong so that it will withstand the severe strains to which it is subjected.

Since the compressor 78 is a high speed compressor and is designed with sufficient capacity to provide the necessary amount of air at all times, I have found it is not necessary to provide a storage reservoir in pipe 82, although this may be done if it should be found to be desirable.

The seeds that are to be handled by this apparatus are of such nature that they do not flow readily and it is therefore desirable to have some means of agitating the seeds so that they will enter the openings 59. Mechanical agitators add to the complexity of the apparatus and also injure the seeds and for this reason I am not employing such agitators. In my apparatus the seeds are agitated by the action of the air, in a manner which will now be described. The adjacent surfaces of plates 60 and disks 57 are machined so as to make a close fit, but this fit is never so close that it is absolutely air tight, and therefore, after the seeds have been removed from the holes 59, by the air and a solid portion of the disk has been interposed, the air pressure that still remains in the pipes will cause air to escape between the adjacent surfaces of plates 60 and disks 57 and this stream of air usually has sufficient force to stir the light seeds and to prevent them from packing at the bottom of the hopper. This pneumatic means for stirring the seeds is of great importance as it is just as efficient as a mechanical stirrer and does not injure the seeds and requires no extra power.

Owing to the fact that a storage tank is not used, the compressor must operate at a high speed so that at least three or four strokes are made for each operation of the valve. When the valve is opened, the pipes are drained to a low pressure which must be built up before the valve opens again. The pipe connecting the compressor with the valve forms a limited storage chamber and its capacity can be adjusted by varying the length or the diameter of the pipe. The high speed compressor also offers a more uniform resistance to the driving power and it is also more desirable for this reason.

Let us now assume that the parts have been assembled and that they are in the position shown in Fig. 2 and that the hoppers are provided with beet seeds. When the horses or the tractor pull the planter, shafts 51 will be rotated and these will rotate the plates 57 so as to bring successively the openings 59 into position between pipes 64 and 64′. The air compressor will maintain a constant air pressure and the valve will be opened and closed by the mechanism above described at such times that the air blast will remove the seeds from the openings in the plate and move them downwardly at a great velocity in the manner described. The plows 21 will, of course, open a furrow which is covered by the presser wheels 18.

Owing to the fact that the seeds are planted in hills a less quantity of seed is needed per acre. When seeds are planted in drills, it requires from fifteen to twenty-five pounds of seed per acre, whereas, when they are planted in hills, five to six pounds are sufficient, and this makes a great saving in the cost of the seed. In addition to the saving just mentioned, there is a large saving in labor, as seeds planted in hills do not require as much labor for thinning, as when they are planted in the usual way. Since less time is required for thinning the beets, they have a longer time in which to grow and therefore develop to a greater extent than when planted in the ordinary manner. The warm air that is applied to the beets at the time of planting strikes the seed bed and warms the latter as the air is always heated to quite a high temperature during compression. The warming of the ground facilitates germination and, as above explained, when the seeds are deposited in the warm moist seed bed, they start germinating almost immediately and all at the same time, which produces a better stand of beets than if the seeds were planted in any other way.

Although this apparatus has been described as useful more particularly with the planting of beet seeds, it can be used for planting cotton seeds, as well as for the planting of any kind of seed, including corn, that require planting in hills.

For the best results the speed of the compressor should be so adjusted that an equal number of strokes will be made between the operations of the valve as in this manner the pressures developed will be equal and therefore the action on the seeds will always be the same.

Having described my invention what I claim as new is:

1. In a planter having a frame which is supported on wheels, and which has plows pivotally connected at their front ends therewith, a hopper for each plow, and a dropping mechanism associated with each hopper, a delivery pipe extending from the under side of the dropping mechanism to a point at the rear of the corresponding plow, said pipe terminating adjacent the bottom of the plow, means for operating the dropping mechanism so as to periodically bring seeds into position above the pipe, means for delivering a blast of air into the upper end of the pipe after the seeds have been deposited therein, whereby the seeds will be moved downwardly through the pipe at a high speed, and means for directing a stream of air into the lower end of each hopper for the purpose of stirring the seeds contained therein.

2. In a planter having a frame which is supported on wheels, and which has plows pivotally connected at their front ends therewith, a hopper for each plow, and a dropping mechanism associated with each hopper, a delivery pipe extending from the under side of the dropping mechanism to a point at the rear of the corresponding plow, said pipe terminating adjacent the bottom of the plow, means for operating the dropping mechanism so as to periodically bring seeds into position above the pipe, and means for delivering a blast of air into the upper end of the pipe after the seeds have been deposited therein whereby the seeds will be moved downwardly through the pipe at a high speed, the delivery pipe having a notch cut out of its front lower end whereby the seeds will be given a forward movement with respect to the delivery pipe.

3. A planter comprising, in combination, a frame provided with supporting wheels, a hopper connected with the frame, the bottom of the hopper being located below the frame and provided with a dropping mechanism, a plow connected at its front end to the frame, a single pipe extending from the dropping mechanism to a point directly behind the plow and near the bottom thereof, means for intermittently delivering seed to the upper end of the pipe, a source of air under pressure, a pipe extending from the pressure source to the dropper, the lower end of the pipe terminating in an opening located directly over the first named pipe, means for bringing seeds into position at the top of the first named pipe, a valve between the air supply and the dropping mechanism, and means for opening the valve after the seeds have been brought into position above the first named pipe.

4. In a planter having a frame supported on wheels, a plow, a seed hopper, and a dropping mechanism, a pipe connected with the dropping mechanism and forming a conduit from the dropper to the bottom of the plow, means for operating the dropper when the planter is in motion and means for periodically directing a blast of air into the pipe and into the hopper whereby the seeds are caused to move downwardly through the pipe at a high velocity and whereby the seeds in the hopper are stirred.

5. A planter comprising, in combination, a plow for cutting a seed furrow, a seed hopper located above the plow, a dropping mechanism associated with the hopper, said dropper having a plate that rotates about an axis and which is provided with a plurality of equiangularly spaced openings whose sides flare outwardly and downwardly, an end closure located on the under side of the plate, said end closure having an opening whose center coincides with the locus of the paths of the openings in the plate, a pipe having its upper end located in the hole in the end closure, the inside diameter of the pipe being as large as the greatest diameter of the openings in the plate, a disk located above the plate and having an opening in axial alignment with the opening in the end closure, a source of air under pressure, a pipe extending from the air source to the opening in the disk, means for rotating the plate, a valve in the air pipe, and means for opening the valve at the time that the opening in the rotating plate is in substantial alignment with the opening in the downwardly extending pipe.

6. In a pneumatic planter having a plow, a hopper provided with a dropper mechanism, a tube extending from the dropper mechanism to near the bottom of the plow, a source of compressed air, a pipe from the air source to the dropper, a normally closed valve mechanism in the pipe, means for opening the valve, and means for holding the valve open for a short period after the first valve opening means has functioned.

7. In a pneumatic planter having a plow, a hopper provided with a dropper mechanism, a tube extending from the dropper mechanism to near the bottom of the plow, a source of compressed air, a pipe from the air source to the dropper, a normally closed valve mechanism in the pipe, means comprising a spring pressed lever and a cam for moving the valve to partly open position, and means comprising another lever and another cam for still further opening the valve and for holding it in fully open position until after the first valve opening means has been returned to inoperative position.

8. In a pneumatic planter having a dropping mechanism, a source of air under pressure and a normally closed spring pressed valve for controlling the flow of air, means for operating the valve, said means comprising a lever, a spring having one end secured to the lever and the other end connected with a stationary member, said lever when unrestrained being adapted to come into engagement with the valve and to move the latter to open position, a cam in contact with the lever, said cam, having a cam surface adapted to move the lever into and out of position with the valve, a second lever having one end connected with the valve stem and being pivoted to a stationary member, and means comprising a cam for engaging the lever and for moving the valve to open position and for holding it in open position until after the first valve operating means has returned to inoperative position.

In testimony whereof I affix my signature.

ANDREW A. MATHESON.